(12) United States Patent
Lee et al.

(10) Patent No.: US 7,106,507 B2
(45) Date of Patent: Sep. 12, 2006

(54) FLEXIBLE WIRE GRID POLARIZER AND FABRICATING METHOD THEREOF

(75) Inventors: Ki Dong Lee, Sungnam-si (KR); Seh Won Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/117,040

(22) Filed: Apr. 28, 2005

(65) Prior Publication Data

US 2005/0243447 A1 Nov. 3, 2005

(30) Foreign Application Priority Data

Apr. 30, 2004 (KR) .................... 10-2004-0030503

(51) Int. Cl.
*G02B 5/30* (2006.01)

(52) U.S. Cl. .................. 359/486; 359/900; 216/24; 264/1.31

(58) Field of Classification Search ............. 359/900, 359/485–486
See application file for complete search history.

(56) References Cited

U.S. PATENT DOCUMENTS

| | | | |
|---|---|---|---|
| 4,387,133 A * | 6/1983 | Ichikawa et al. ............ 428/215 |
| 5,096,563 A * | 3/1992 | Yoshizawa et al. ........... 205/68 |
| 6,262,787 B1 * | 7/2001 | Kamoi et al. .................. 349/96 |
| 6,358,442 B1 * | 3/2002 | Delaney et al. ............. 264/1.31 |
| 6,391,528 B1 | 5/2002 | Moshrefzadeh et al. |
| 6,627,034 B1 * | 9/2003 | Ufer et al. ................... 156/289 |
| 2002/0191286 A1 | 12/2002 | Gale et al. |
| 2005/0159019 A1 * | 7/2005 | Lee .............................. 438/800 |
| 2006/0056024 A1 * | 3/2006 | Ahn et al. .................... 359/486 |

FOREIGN PATENT DOCUMENTS

JP 60066203 4/1985

* cited by examiner

*Primary Examiner*—Drew A. Dunn
*Assistant Examiner*—Scott H Stephens
(74) *Attorney, Agent, or Firm*—Lee, Hong, Degerman, Kang & Schmadeka (57) ABSTRACT

The present invention provides a flexible wire grid polarizer used in a visible ray band and a fabricating method thereof. The present invention includes the steps of forming a non-adhesive layer on an inner area of a lower substrate, forming a flexible polymer substrate on the lower substrate including the non-adhesive layer, forming a thin metal layer on the flexible polymer substrate, forming a metal grid pattern by etching the thin metal layer, dicing a wafer staying within a boundary of the non-adhesive layer on the lower substrate, and separating the lower substrate including the non-adhesive layer from the diced wafer to complete the flexible wire grid polarizer.

16 Claims, 10 Drawing Sheets

FLEXIBLE WIRE GRID POLARIZER AND FABRICATING METHOD THEREOF

BACKGROUND OF THE INVENTION

1. Field of the Invention

The present invention relates to a flexible wire grid polarizer used in a visible ray band and a fabricating method thereof.

2. Discussion of the Related Art

Generally, an array of parallel conductive wires arranged in parallel to polarize a specific polarized light has been used about 110 years. Such a parallel conductive wire array is called a wire grid in general. And, the wire grid is used on a transparent substrate as a polarizer in an infrared area among electromagnetic waves.

Major factors of determining polarizer performance of the wire grid are parallel lines and a distance between centers of the parallel lines, i.e., a relation between a cycle and a wavelength of an incident wave.

If an interval of a wire grid or a cycle is longer than a wavelength of an incident wave, the wire grid operative as a diffraction grid rather than a polarizer to diffract a polarized light. Hence, diffraction occurs regardless of the polarized light to form theoretically well-known diffraction interference patterns attributed to the phase difference.

If the difference between centers of lines or cycle is shorter than a wavelength, the wire grid is operative as a polarizer to reflect an electromagnetic wave polarized in parallel to the wire grid or to transmit the electromagnetic wave of orthogonal polarization. In this case, a transmissive area, in which a cycle of the wire grid lies within a range of 0.5*wavelength ~2*wavelength, depends on variations of transmission and reflection characteristics of the wire grid.

Specifically, a rapid increase of reflectivity for an orthogonally polarized light to the wire grid and a corresponding transmitivity decrease take place on at least one specific wavelength in a predefined incident angle.

Meanwhile, cycle, line width, line thickness, property of grid material, characteristic of substrate (refractive index), wavelength of incident wave, incident angle of incident wave and the like are taken into consideration as important factors in manufacturing a polarized beam splitter using a wire grid.

It has been well known that metal wires arranged parallel in the aforesaid manner selectively reflect or transmit a polarized light of electromagnetic wave. If a cycle of the metal wire arrangement is shorter than a wavelength of an incident electromagnetic wave, a polarized (S-wave) component parallel to the metal wires is reflected and a polarized (P-wave) component orthogonal to the metal wires is transmitted.

A light of S-polarization, which has a polarization vector orthogonal to an incident plane, is parallel to a conductive factor. And, a light of P-polarization, which has a polarization vector parallel to the incident plane, is orthogonal to the conductive factor. Using such a phenomenon, it is able to fabricate a planar polarizer having excellent polarization efficiency, high transmitivity and wide viewing angle. Such a device can be called a wire grid polarizer. The wire grid polarizer consists of a glass substrate and an aluminum grid of which cycle is set to 200 nm or less to be provided with a polarizing function in visible rays. Namely, the wire grid polarizer consists of several parallel conductive electrodes supported by the glass substrate.

The wire grid polarizer generally reflects light having an electric field vector parallel to a conductive wire of a grid and transmits light having an electric field vector orthogonal to the conductive wire. In this case, an incident plane may be orthogonal to the wire grid or may not.

Ideally, the wire grid is a perfect mirror like S-polarization for one light polarization and is perfectly transparent for another polarization like P-polarization. Substantially, a mirror-like reflective metal absorbs a small quantity of incident angle and reflects about 90~95%, whereas a plane mirror does not transmit 100% of incident light due to surface reflection.

Figure 1:
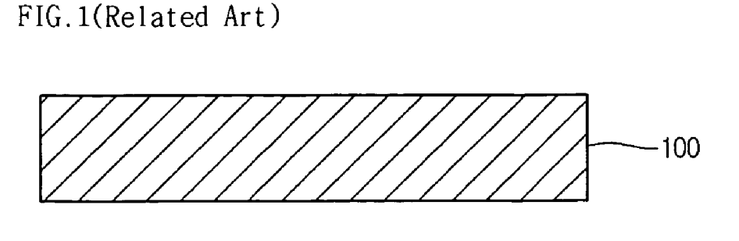
FIGS. 1 to 8 are cross-sectional diagrams of a process of fabricating a wire grid polarizer according to a related art.
Figure 2:
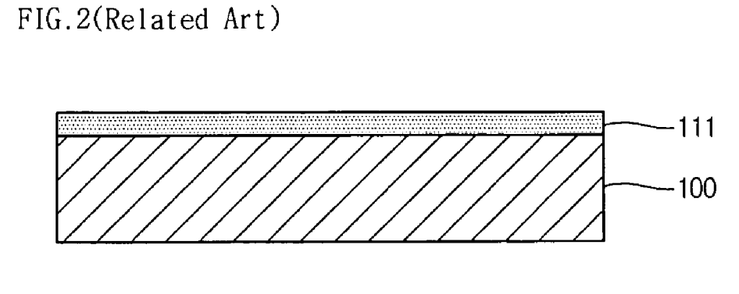

FIGS. 1 to 8 are cross-sectional diagrams of a process of fabricating a wire grid polarizer according to a related art. A transparent glass substrate 100, as shown in FIG. 1, is prepared. In this case, both sides of the transparent glass substrate 100 are grinded. A thin metal layer 111 is deposited on the prepared glass substrate 100. In this case, Al, Ag, Cr or the like can be used as the thin metal layer 111.

Figure 3:
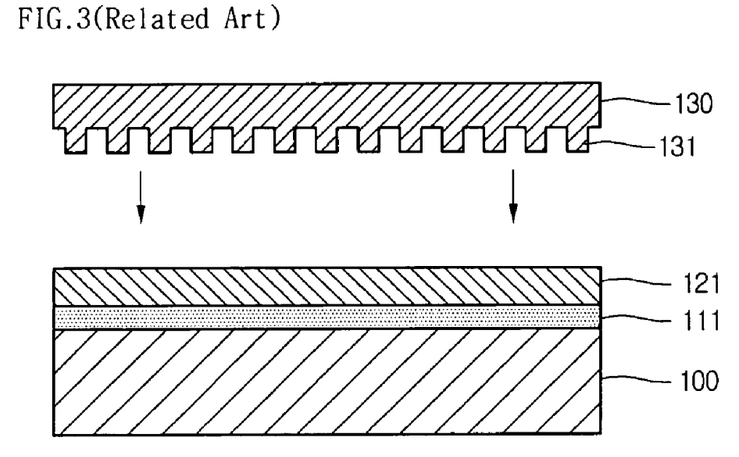

After the thin metal layer 111 has been coated on the glass substrate 100, a polymer 121, as shown in FIG. 3, is coated on the thin metal layer 111. By pressurizing the polymer 121 with a prepared mold 130, a pattern 131 of the mold 130 is transcribed to the polymer 121. In this case, if the polymer 121 is a thermo-hardening material, a metal mold is used. If the polymer 12 is a UV-hardening material, a transparent polymer mold is used.

Figure 4:
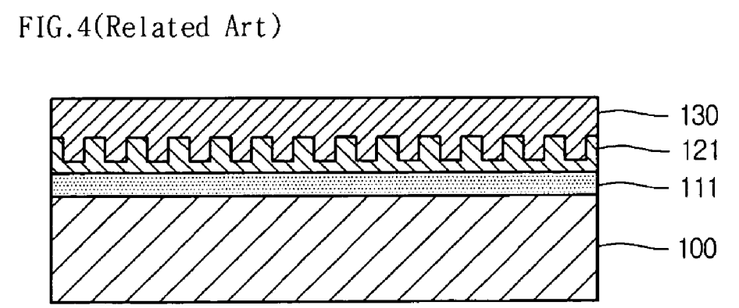

Once the pattern of the mold 130 is transcribed to the polymer 121, the mold 130, as shown in FIG. 4, is placed parallel to the polymer 121 after the polymer 121 has been coated on the thin metal layer 111. Heat or UV-ray is then applied to the mold 130 to harden the polymer 121. Namely, if the polymer 212 is the thermo-hardening material, the polymer is hardened by hot stamping. If the polymer is the UV-hardening material, a transparent mold is used by UV stamping instead of hardening the coated polymer.

Figure 5:
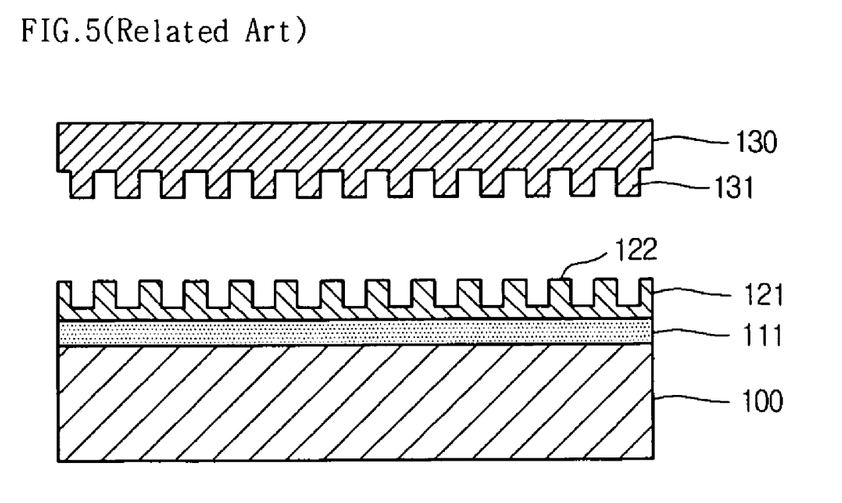

After the polymer 121 has been hardened, the mold 130, as shown in FIG. 5, is separated from the polymer 122. Hence, a pattern 122 identical to the pattern 131 of the mold 130 is transcribed to the polymer 121 from which the mol 130 has been removed. In this case, tops and bottoms of the pattern 122 are opposite to those of the pattern 131 of the mold 130. In case of using hot stamping, the mold 130 is separated from the polymer 121 after a temperature of the substrate has been lowered. In case using UV stamping, the mold 130 is separated from the polymer 122 after completion of UV hardening.

Figure 6:
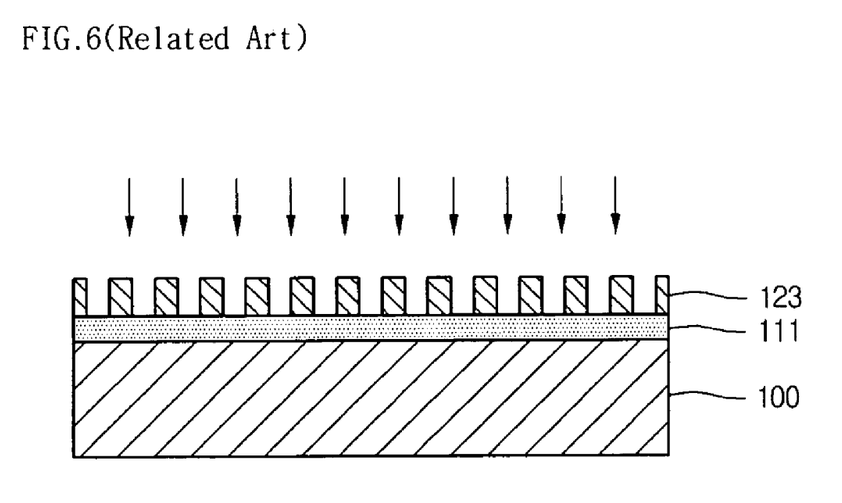

After the mold 130 has been separated from the polymer 121, dry etch is carried out on an entire surface of the polymer pattern to expose a surface of the thin metal layer, as shown in FIG. 6, is exposed. Since prominence and depression is formed on the dry-etched polymer 121 by the mold 130 to have a step difference, the thin polymer is removed by the etch process to expose the surface of the thin metal layer.

Figure 7:
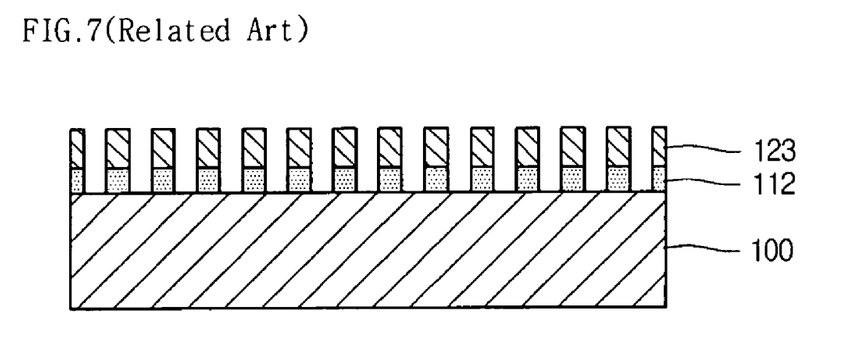

Once the dry-etched polymer 123 is formed, a metal grid pattern 112, as shown in FIG. 7, is formed by etching the exposed thin metal layer 111 by dry or wet etch.

Figure 8:
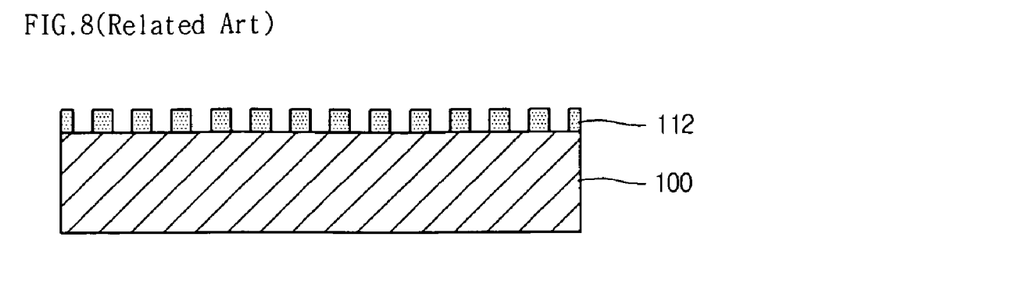

Subsequently, the polymer 123 remaining on the metal grid pattern 112 is removed to complete the wire grid polarizer, as shown in FIG. 8, having the specific metal grid pattern 112 on the substrate 100.

However, since the related art wire grid polarizer is fabricated on the glass substrate by a general semiconductor fabricating process, it is difficult to use the glass substrate that is thin.

And, the glass substrate is not fit for lightweight and duration.

Moreover, in case of a polarizing device having flexibility such as a flexible display and the like, it is unable to use the wire grid polarizer fabricated on the glass substrate.

SUMMARY OF THE INVENTION

Accordingly, the present invention is directed to a wire grid polarizer and fabricating method thereof that substantially obviates one or more problems due to limitations and disadvantages of the related art.

An object of the present invention is to provide a wire grid polarizer and fabricating method thereof, in which a microscopic grid pattern is formed on a flexible polymer substrate and by which a flexible wire grid polarizer can be fabricated.

Another object of the present invention is to provide a wire grid polarizer and fabricating method thereof, by which the wire grid polarizer is widely applicable to fabrications of flexible display and optical devices.

Another object of the present invention is to provide a wire grid polarizer and fabricating method thereof, by which lightweight and excellent durability can be provided to the wire grid polarizer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a flexible wire grid polarizer according to the present invention includes a flexible polymer substrate having a predetermined thickness and a metal grid on the flexible polymer substrate with a predetermined cycle to polarize a visible ray.

In another aspect of the present invention, a method of fabricating a flexible wire grid polarizer includes the steps of forming a non-adhesive layer on an inner area of a lower substrate, forming a flexible polymer substrate on the lower substrate including the non-adhesive layer, forming a thin metal layer on the flexible polymer substrate, forming a metal grid pattern by etching the thin metal layer, dicing a wafer staying within a boundary of the non-adhesive layer on the lower substrate, and separating the lower substrate including the non-adhesive layer from the diced wafer to complete the flexible wire grid polarizer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A flexible wire grid polarizer and fabricating method thereof according to the present invention are explained with reference to the attached drawings as follows.

Figure 9:
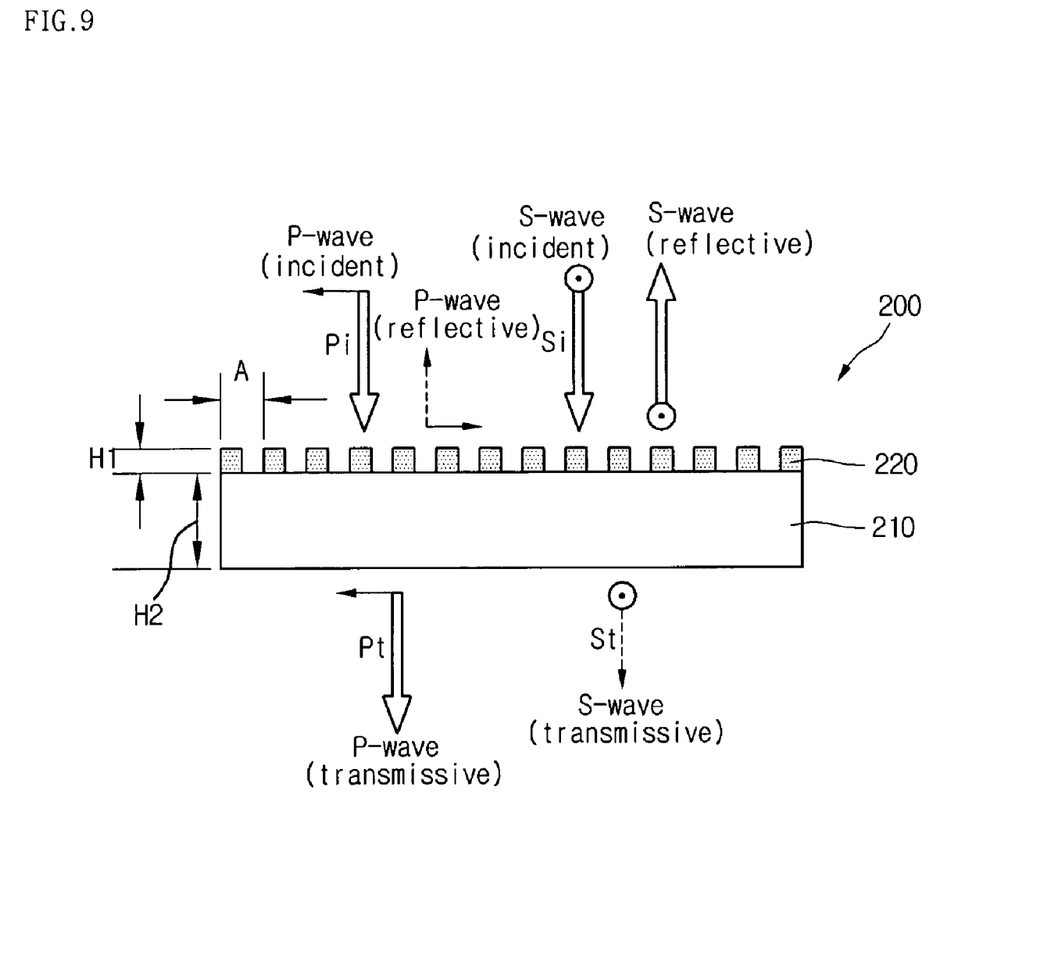
FIG. 9 is a cross-sectional diagram of a flexible wire grid polarizer according to one preferred embodiment of the present invention.

FIG. 9 is a cross-sectional diagram of a flexible wire grid polarizer according to one preferred embodiment of the present invention.

Referring to FIG. 9, a flexible wire grid polarizer 200 includes a flexible polymer substrate 210 and a metal grid 220 having a pattern from on the substrate 210 with a predetermined cycle A and thickness H1. Thickness of the polymer substrate 210 is 1~1,000 μm and the predetermined cycle A of the pattern of the metal grid 220 is equal to or smaller than 200 nm. Optionally, a polymer layer can be formed under the flexile polymer substrate 210.

A fabricating process of the wire grid polarizer 200 is firstly performed on a hard wafer or substrate such as a silicon wafer, a glass substrate and the like. And, the wafer is separated in a last stage. Moreover, a polymer layer capable of adjusting adhesiveness is formed between the hard wafer and the flexible polymer substrate to facilitate the separation of the hard wafer.

The wire grid polarizer fabricated in the above-explained manner is one wide flat panel polarizer device having the cycle A of the metal grid pattern shorter than a wavelength of an incident electromagnetic wave. Hence, the wire grid polarizer reflects a polarized component (S-wave) parallel to the metal wire and transmits the polarized component (P-wave) vertical to the metal wire. Therefore, the wire grid polarizer has excellent polarization efficiency, high transmitivity and wide viewing angle.

Figure 10:
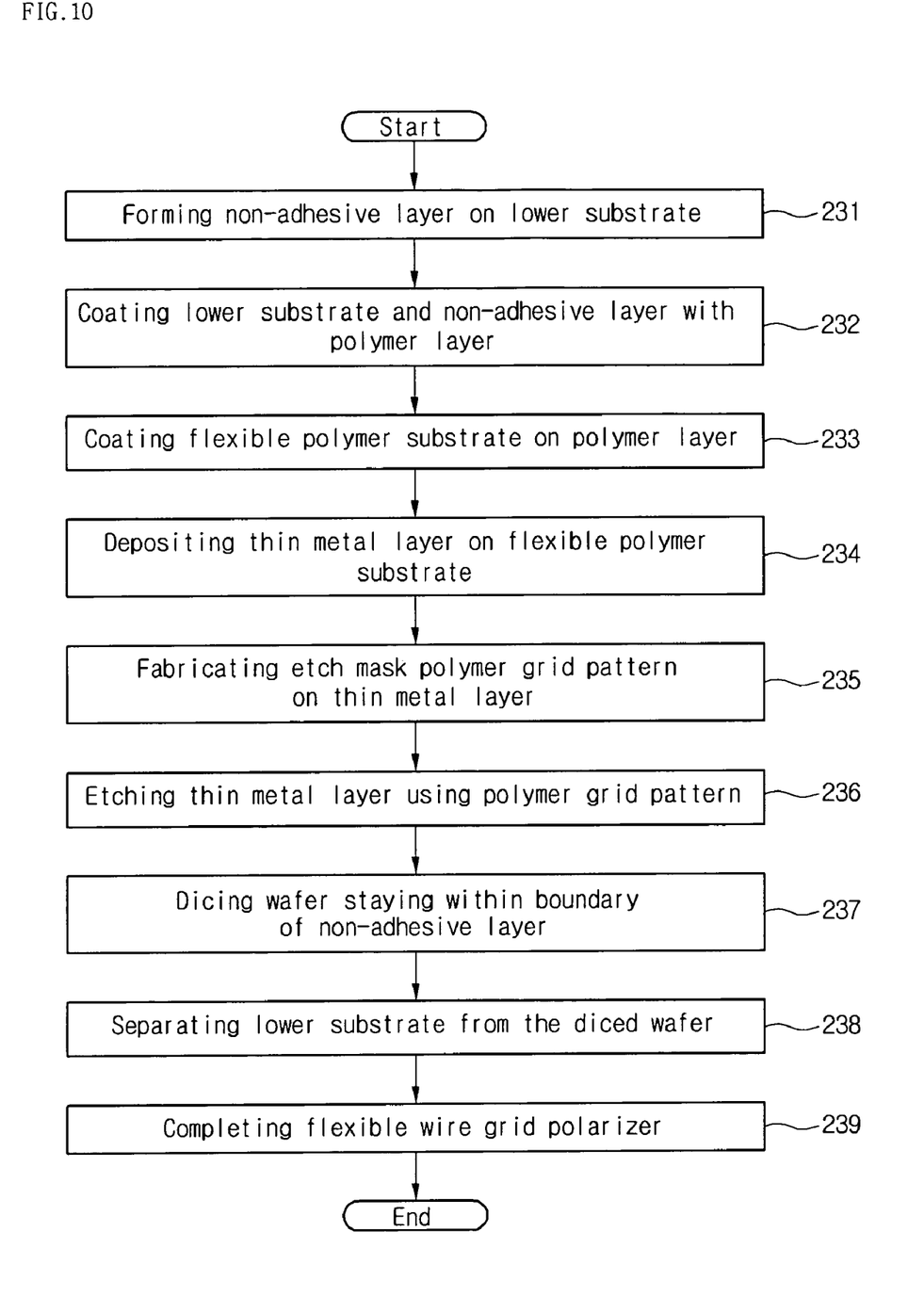
FIG. 10 is a flowchart of a method of fabricating a flexible wire grid polarizer according to an embodiment of the present invention.

FIG. 10 is a flowchart of a method of fabricating a flexible wire grid polarizer according to an embodiment of the present invention.

Referring to FIG. 10, a non-adhesive layer is formed on an inside area of a lower substrate having predetermined solidity such as silicon and glass (231). And, a polymer layer is formed on the non-adhesive layer and the lower substrate (232). A flexible polymer substrate having predetermined thickness (1~1,000 μm) on the polymer layer (233). And, a thin metal layer having predetermined thickness is deposited on the flexible polymer substrate (234). Alternatively, the polymer layer may not be formed according to a adhesion characteristic between the lower substrate and the flexible polymer substrate.

After the thin metal layer has been deposited on the flexible polymer substrate, patterning and etch processes are carried out on the thin metal layer to form a specific pattern of the thin metal layer.

Specifically, after the thin metal layer has been deposited on the flexible polymer substrate, a polymer grid pattern as an etch mask is formed on the thin metal layer for a pattern cycle and width of the thin metal layer (235). After completion of the polymer grid pattern, the thin metal layer is etched using the polymer grid pattern to form a metal grid on the flexible polymer substrate (236).

By completing the metal grid on the flexible polymer substrate, a process of fabricating a flexible wire grid polarizer is completed. Subsequently, an inner wafer staying within a boundary of the non-adhesive layer is entirely diced (237). And, the lower substrate attached to the non-adhesive layer is separated from the diced wafer 238 to complete the flexible wire grid polarizer (239). In doing so, a plurality of flexible wire grid polarizers can be simultaneously fabricated on one wafer.

A method of fabricating the wire grid polarizer shown in FIG. 10 is explained in detail with reference to FIGS. 11 to 20 as follows. FIGS. 11 to 20 are cross-sectional diagrams of a method of fabricating a flexible wire grid polarizer according to an embodiment of the present invention.

Figure 11:
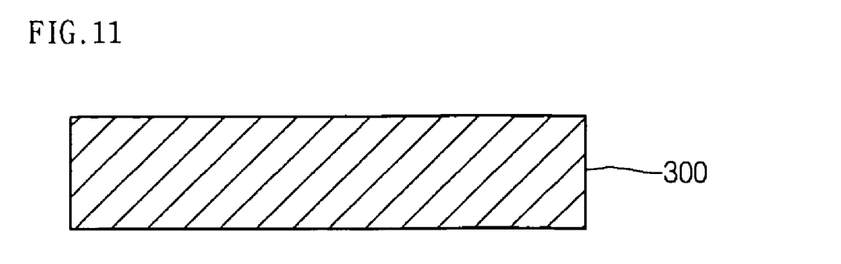
FIGS. 11 to 20 are cross-sectional diagrams of a method of fabricating a flexible wire grid polarizer according to an embodiment of the present invention.

Referring to FIG. 11, a lower substrate 300 for fabricating a device using a semiconductor process is prepared. A semiconductor substrate of silicon and the like, a glass substrate, a hard polymer substrate or the like can be used as the lower substrate 300.

Figure 12:
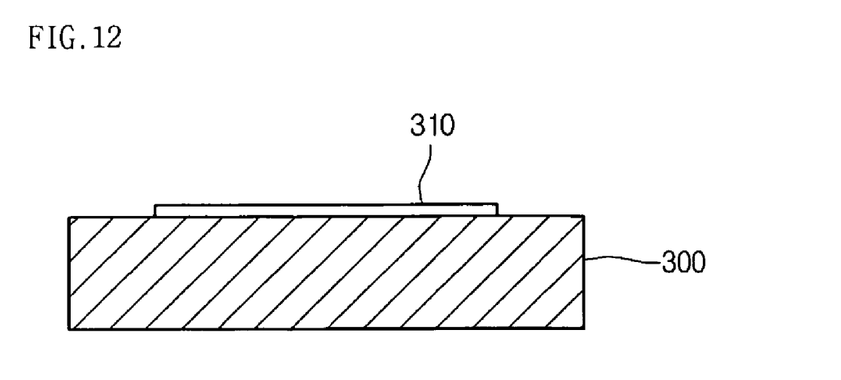

Once the lower substrate 300 is prepared, a non-adhesive layer 310, as shown in FIG. 12, is formed on an inside area on the lower substrate 300. The non-adhesive layer 310 is provided to facilitate a device to be finally separated from the lower substrate 300 after completion of device fabrication. For this, the non-adhesive layer 310 needs to have small adhesiveness to a polymer layer to be coated thereon. An Au layer, a silane based SAM (self-assembled monolayer) or the like is used as the non-adhesive layer 310. Specifically, a specific kind of polymer layer suitable for each non-adhesive layer is needed.

Figure 13:
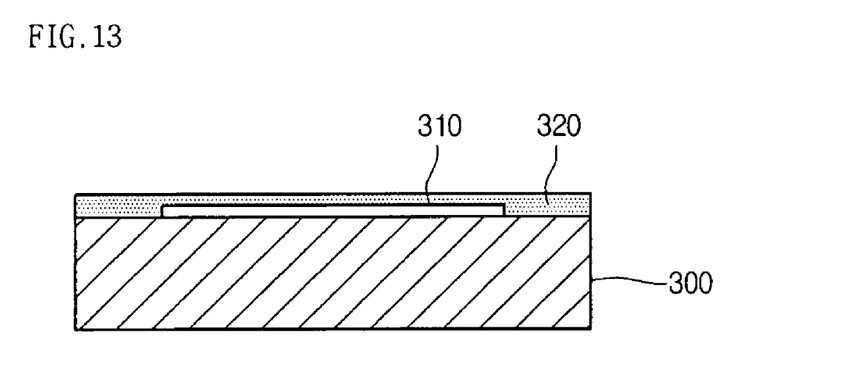

Once the non-adhesive layer 310 is formed on the lower substrate 300, a polymer layer 320, as shown in FIG. 3, is coated on the lower substrate 300 and the non-adhesive layer 310. Namely, the polymer layer 320 is simultaneously coated on one area on which the non-adhesive layer 310 is formed and the other area on which the non-adhesive layer 310 is not formed.

A basic material of the polymer layer 320 depends on a species of the non-adhesive layer 310. Namely, the polymer layer 320 needs strong adhesiveness to the lower substrate 300 and weak adhesiveness to the non-adhesive layer 310. By considering such characteristics, the basic material of the polymer layer 320 is decided. For instance, if the lower substrate 300 employs a silicon substrate and if the non-adhesive layer 310 is formed of Au, the polymer layer 320 is formed of SU-8 photoresist. For another instance, if the lower substrate 300 employs a silicon substrate and if the non-adhesive layer 310 employs a silane based SAM layer, the polymer layer 320 may not be deposited in case that a substrate having weak adhesiveness to the lower substrate 300 is used. In this case, criteria for strong and weak adhesiveness can be set by relative strength. SU-8 used as the polymer layer is a sort of photoresist produced by Micro Resist Technology Co., Germany.

Figure 14:
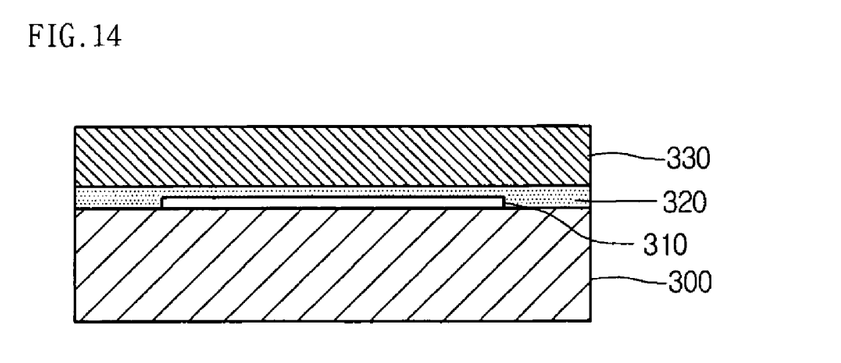

Once the polymer layer 320 is coated on the lower substrate 300 and the non-adhesive layer 310, a flexible polymer layer 330, as shown in FIG. 14, is coated on the coated polymer layer 320. The flexible polymer substrate 330 is formed 1~1,000 μm and uses UV-hardening resin such as UV15 or thermo-hardening polymer such as polyimide.

Figure 15:
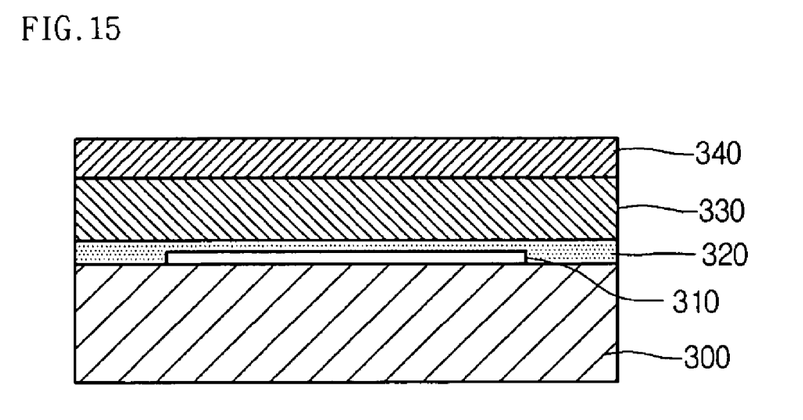

Once the flexible polymer substrate 330 is coated, a thin metal layer 340, as shown in FIG. 15, is formed on the flexible polymer substrate 330. The thin metal layer 340 can use Al, Ag, Cr and the like. For instance, in case of using a thin Al layer as the thin metal layer 340, the thin AL layer is deposited by sputtering.

Figure 16:
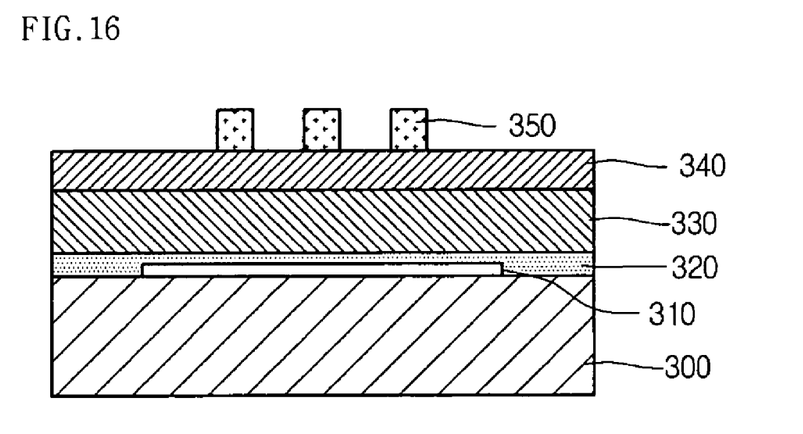

Once the thin metal layer 341 is formed, a polymer grid pattern 350 for an etch mask, as shown in FIG. 16, is formed on the thin metal layer 340. Preferably, a cycle of the polymer grid pattern 350 is set equal to that of a metal grid of a wire grid polarizer operative in visible rays. For instance, the cycle of the polymer grid pattern is set equal to or smaller than 200 nm.

The polymer grid pattern 350 is formed in a manner of coating polymer on the thin metal layer 340 and etching the polymer by photolithography, e-beam lithography, laser interference lithography, nano-imprint lithography using stamp and the like. Preferably, the polymer grid pattern 350 is formed on an extended line of the non-adhesive layer 320.

Figure 17:
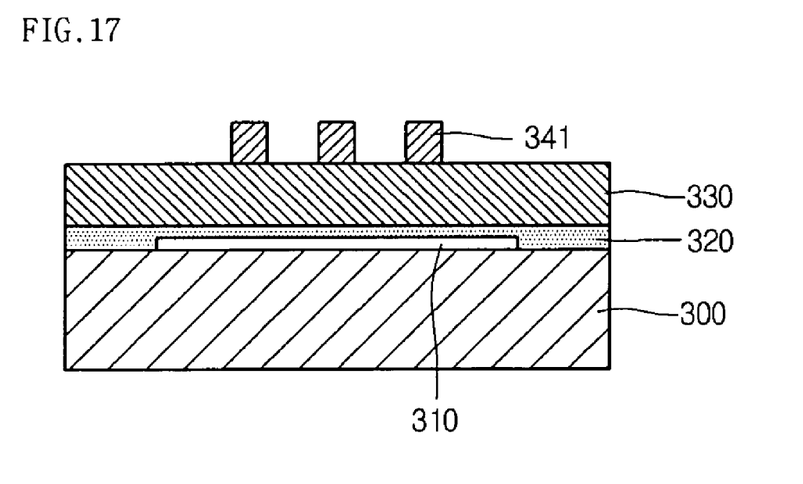

After the polymer grid pattern 350 has been fabricated, the thin metal layer 340 is etched using the polymer grid pattern 350. The polymer grid pattern 350 remaining on the etched thin metal layer is then removed. Hence, a metal grid 341, as shown in FIG. 17, having the same pattern of the polymer grid pattern 350 is formed on the flexible polymer substrate 330.

In doing so, the thin metal layer 340 is etched by dry etch such as reactive ion etch or wet etch using a specific etchant. After completion of etch, the polymer pattern remaining on the metal grid 341 is removed.

Figure 18:
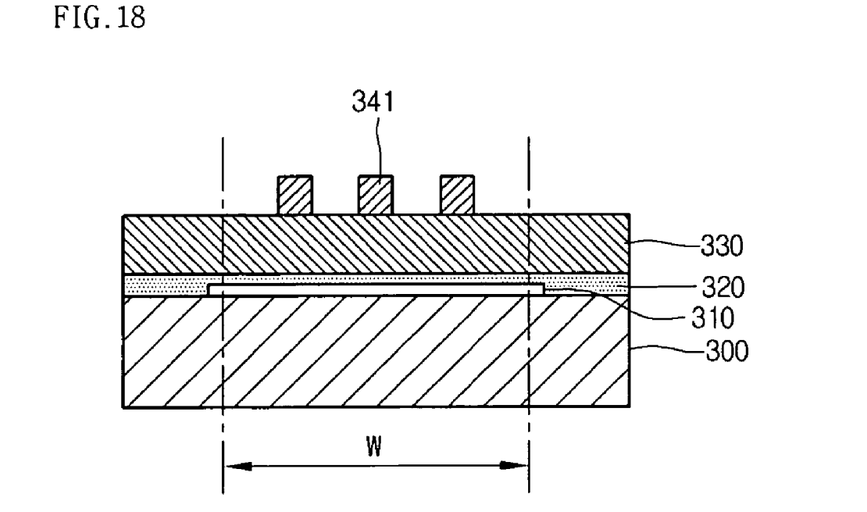

After the pattern of the thin metal layer 341 has been formed, an entire wafer is diced to obtain a wafer of an inner area W staying within a boundary of the non-adhesive layer 310 indicated by a doted line in FIG. 18.

Figure 19:
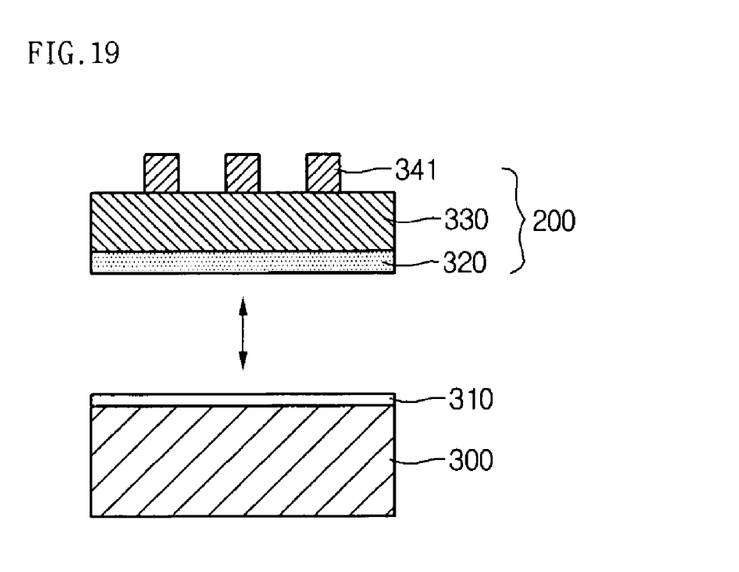
Figure 20:
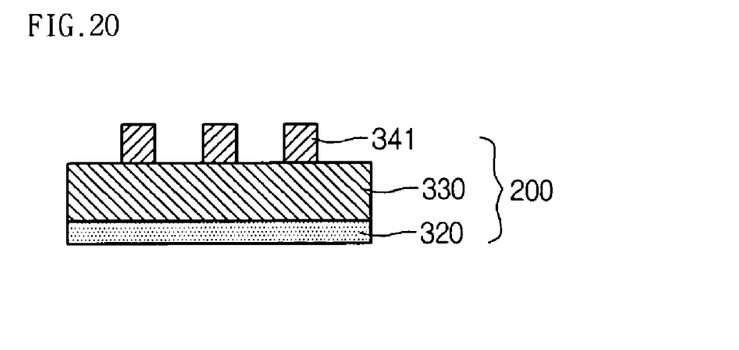

The lower substrate 300, as shown in FIG. 19, is separated from the diced wafer. Namely, since the adhesiveness between the polymer layer 320 and the non-adhesive layer 310 is weak, the lower substrate 300 having the non-adhesive layer 310 is easily separated. Once the lower substrate 300 is separated, a flexible wire grid polarizer 200, as shown in FIG. 20, is completed. Hence, the wire grid 200 including the polymer layer 320, the flexible polymer substrate 330 and the metal grid 341 is obtained.

In the above-explained fabricating process, the conventional wire grid polarizer fabricating method can be used and the hard substrate is facilitated to be separated later.

Figure 21:
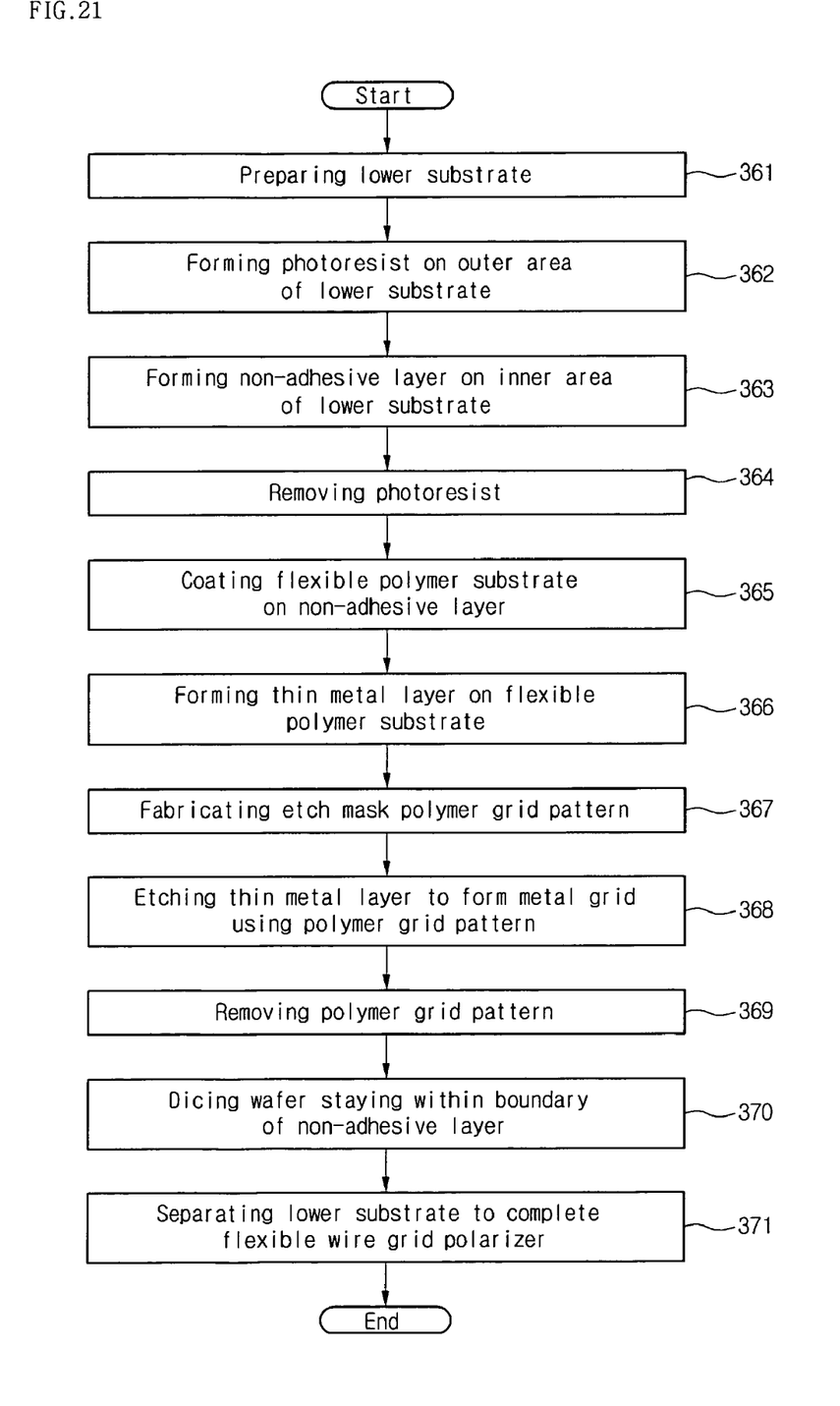
FIG. 21 is a flowchart of a method of fabricating a flexible wire grid polarizer according to another embodiment of the present invention.

In another embodiment of the present invention, a non-adhesive layer is differently formed. FIG. 21 is a flowchart of a method of fabricating a flexible wire grid polarizer according to another embodiment of the present invention.

Referring to FIG. 21, a lower substrate 361 is prepared. Photoresist is formed on an outer area of the lower substrate (362). A non-adhesive layer is formed on a central area that is an inner area of the lower substrate by performing surface treatment with chemicals (363). Once the non-adhesive layer is formed on the lower substrate, the photoresist is removed (364). A flexible polymer substrate and a thin metal layer are sequentially formed on the non-adhesive layer provided to the lower substrate (365, 366). An etch mask polymer grid pattern is fabricated on the thin metal layer (367). The thin metal layer is then etched using the polymer grid pattern to form a metal grid (368).

Once the metal grid is formed on the flexible polymer substrate, the polymer grid pattern is removed (369). An entire wafer staying within a boundary of the non-adhesive layer is diced (370). A flexible wire grid polarizer is then completed by separating the lower substrate having the non-adhesive layer formed thereon from the diced wafer (371).

A method of fabricating the flexible wire grid polarizer shown in FIG. 21 is explained in detail with reference to FIGS. 22 to 31 as follows. FIGS. 22 to 31 are cross-sectional diagrams of a method of fabricating a flexible wire grid polarizer according to another embodiment of the present invention.

Figure 22:
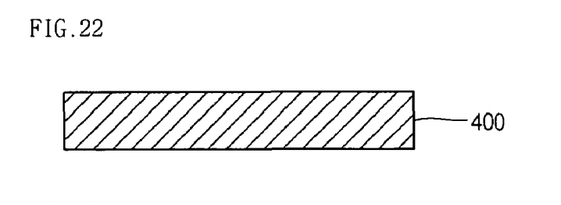
FIGS. 22 to 31 are cross-sectional diagrams of a method of fabricating a flexible wire grid polarizer according to another embodiment of the present invention.

Referring to FIG. 22, a lower substrate 400 having a predetermined solidity for fabricating a device using a semiconductor process is prepared. A semiconductor substrate of silicon and the like, a glass substrate, a hard polymer substrate or the like can be used as the lower substrate 400.

Figure 23:
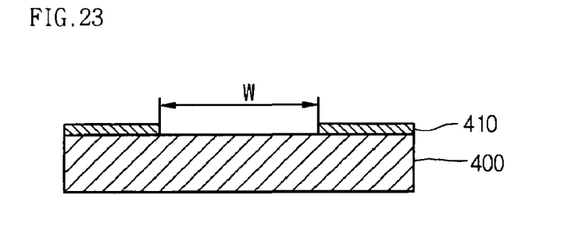
Figure 24:
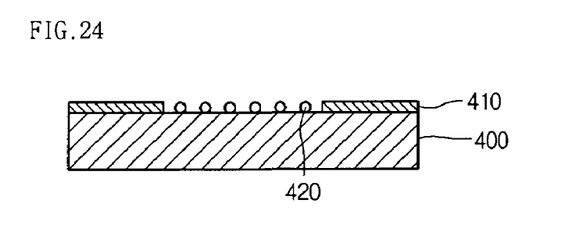

Once the lower substrate 400 is prepared, a surface of an outer area of the lower substrate 400 is covered with photoresist 410 and the like. A surface treatment area W situated at a center of the lower substrate 400 is an area where a non-adhesive layer such as an SAM layer will be formed by surface treatment with silane based material. Namely, by carrying out surface treatment on the surface treatment area W on the lower substrate 400 with silane based chemicals to form the SAM layer, i.e., a non-adhesive layer 420 as shown in FIG. 24.

Figure 25:
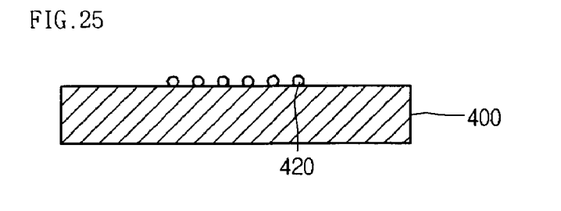

Hence, the non-adhesive layer 420, as shown in FIG. 25, is formed after removing the photoresist 410 from the lower substrate 400. In using this method, it is unnecessary to form a polymer layer beneath a flexible polymer substrate.

Figure 26:
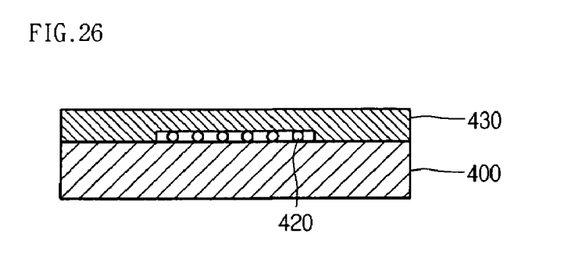

Once the non-adhesive layer 420 is formed, a flexible polymer layer 430, as shown in FIG. 26, is coated on the non-adhesive layer 420. The flexible polymer substrate 430 is formed 1~1,000 µm and uses UV-hardening resin such as UV15 or thermo-hardening polymer such as polyimide.

Figure 27:
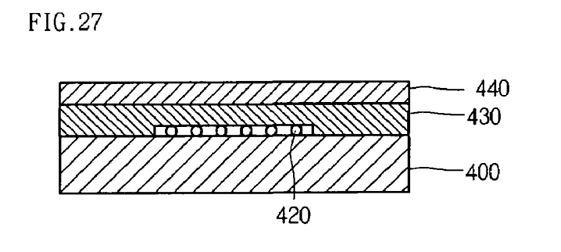

Once the flexible polymer substrate 430 is coated, a thin metal layer 440, as shown in FIG. 27, is formed on the flexible polymer substrate 430. The thin metal layer 440 can use Al, Ag, Cr and the like.

Figure 28:
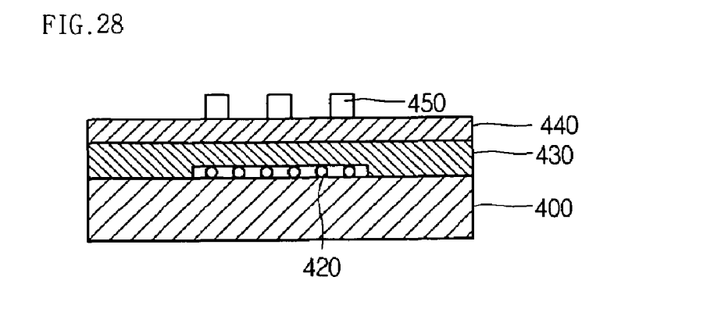

Once the thin metal layer 440 is formed, a polymer grid pattern 450 for an etch mask, as shown in FIG. 28, is formed on the thin metal layer 440. Preferably, a cycle of the polymer grid pattern 450 is set equal to or smaller than 200 nm at least so that a wire grid polarizer is operative in visible rays. The polymer grid pattern 450 is formed by photolithography, e-beam lithography, laser interference lithography, nano-imprint lithography and the like.

Figure 29:
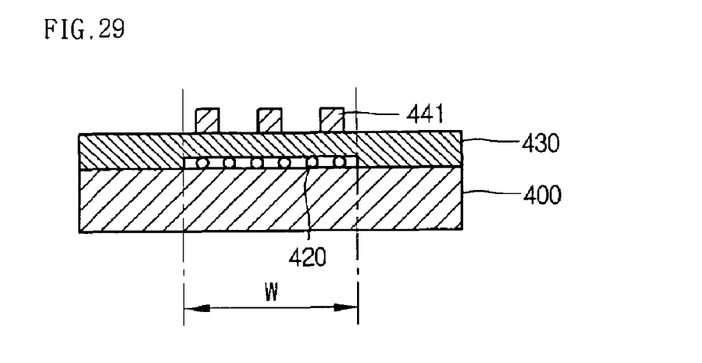

After the polymer grid pattern 450 has been fabricated, the thin metal layer 440 is etched using the polymer grid pattern 450. Hence, a metal grid 441, as shown in FIG. 29, having the same pattern of the polymer grid pattern 450 is formed. In doing so, the thin metal layer 440 is etched by dry etch such as reactive ion etch or wet etch using a specific etchant. After completion of etch, the polymer pattern remaining on the metal grid 441 is removed.

Figure 30:
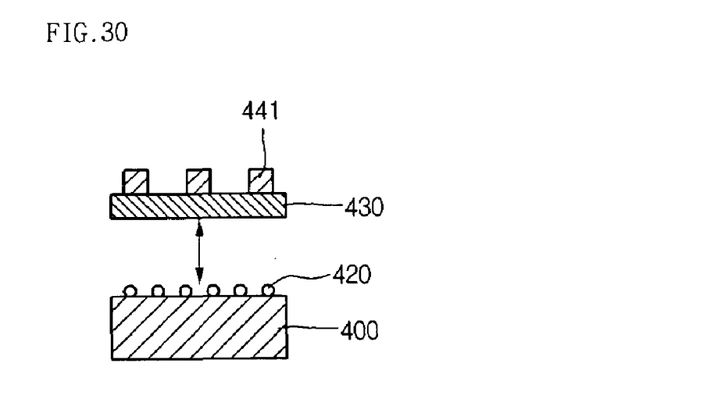
Figure 31:
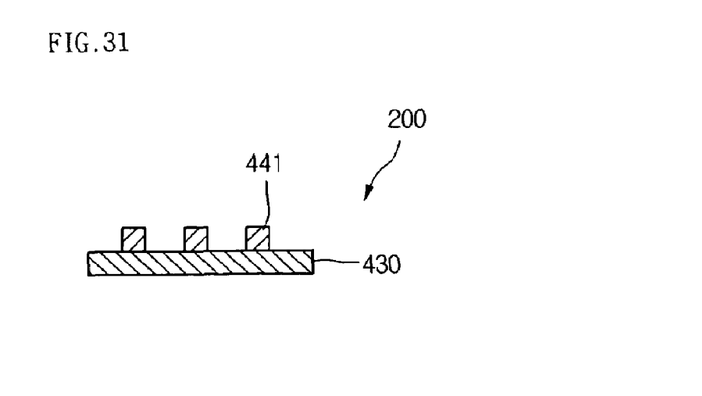

After the pattern of the thin metal layer 441 has been formed, a wafer of an inner area W staying within a boundary of the non-adhesive layer 410 indicated in FIG. 29 is diced. Since the lower substrate 400, the non-adhesive layer 420 and the flexible polymer substrate 430 are formed in the diced wafer area where the adhesiveness between the flexible polymer substrate 430 and the non-adhesive layer 420 is weak, the flexible polymer substrate 430, a shown in FIG. 30, is separated from the non-adhesive layer 420 to complete a flexible wire grid polarizer 200, as shown in FIG. 31, having a plurality of metal grids 441 on the flexible polymer substrate 430. In this case, the area W of the non-adhesive layer may be equal to an area W of the diced water. Yet, the diced wafer area can be smaller than the non-adhesive layer area.

Accordingly, by providing flexible property to the wire grid polarizer used in a visible ray band, it is able to provide the flexible wire grid polarizer.

And, the present invention can provide the thinner, lighter and more durable flexible wire grid polarizer.

Moreover, the present invention uses the flexible polymer substrate, thereby being widely applicable to the fabrications of flexible display devices and optical devices.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of fabricating a flexible wire grid polarizer, comprising the steps of:
    forming a non-adhesive layer on an inner area of a lower substrate;
    forming a flexible polymer substrate on the lower substrate including the non-adhesive layer;
    forming a thin metal layer on the flexible polymer substrate;
    forming a metal grid pattern by etching the thin metal layer;
    dicing a wafer staying within a boundary of the non-adhesive layer on the lower substrate; and
    separating the lower substrate including the non-adhesive layer from the diced wafer to complete the flexible wire grid polarizer.

2. The method of claim 1, wherein a polymer layer is formed between the lower substrate having the non-adhesive layer formed thereon and the flexible polymer substrate.

3. The method of claim 2, wherein the non-adhesive layer is a thin Au layer.

4. The method of claim 2, wherein the non-adhesive layer is formed of a thin Au layer on the lower substrate and wherein the polymer layer is formed of photoresist.

5. The method of claim 1, the step of forming the metal grid pattern, comprising the steps of:
    stacking the thin metal layer and a polymer layer on the flexible polymer substrate sequentially;
    forming a polymer grid pattern having the predetermined cycle using the polymer layer;
    forming the metal layer pattern by etching the thin metal layer using the polymer grid pattern; and
    removing the polymer grid pattern.

6. The method of claim 5, wherein the thin metal layer is formed by reactive dry etch or wet etch using the polymer grid pattern.

7. The method of claim 1, wherein the lower substrate is selected from the group consisting of a semiconductor substrate, a glass substrate and a polymer substrate having predetermined solidity.

8. The method of claim 1, wherein the non-adhesive layer is coated with a material having opposite adhesive characteristics of upper and lower surfaces.

9. The method of claim 1, the non-adhesive layer forming step comprising the steps of:
   forming a photoresist on an outer area of the lower substrate; and
   forming the non-adhesive layer on the inner area of the lower substrate having the photoresist not formed thereon.

10. The method of claim 1, wherein the non-adhesive layer is a silane based SAM (self-assembled mono) layer.

11. The method of claim 1, wherein the thickness of the flexible polymer layer is 1~1,000 µm.

12. The method of claim 1, wherein the flexible polymer substrate is formed of UV-hardening resin or thermo-hardening polymer.

13. The method of claim 1, wherein the thin metal layer is formed of one selected from the group consisting of Al, Ag and Cr.

14. The method of claim 1, wherein the cycle of the metal grid pattern is equal to or smaller than 200 nm.

15. The method of claim 1, wherein the polymer grid pattern is formed by at least one selected from the group consisting of photolithography, e-beam lithography, laser interference lithography and nano-implant lithography.

16. The method of claim 1, wherein the flexible wire grid polarizer is formed plurally on the lower substrate.

* * * * *